(12) United States Patent
Halliburton (10) Patent No.: US 10,502,607 B2
(45) Date of Patent: Dec. 10, 2019

(54) TWIN ROD CLIP SPACER

(71) Applicant: Honeywell International Inc., Morris Plains, NJ (US)

(72) Inventor: Charles David Halliburton, Port Moody (CA)

(73) Assignee: Honeywell International Inc., Morris Plains, NJ (US)

( * ) Notice: Subject to any disclaimer, the term of this patent is extended or adjusted under 35 U.S.C. 154(b) by 1002 days.

(21) Appl. No.: 14/925,316

(22) Filed: Oct. 28, 2015

(65) Prior Publication Data
US 2017/0122353 A1   May 4, 2017

(51) Int. Cl.
*G01F 23/284* (2006.01)
*F16B 7/04* (2006.01)
*F16B 2/22* (2006.01)

(52) U.S. Cl.
CPC .............. *G01F 23/284* (2013.01); *F16B 2/22* (2013.01); *F16B 7/0433* (2013.01)

(58) Field of Classification Search
CPC ........ G01F 23/284–2845; F16B 7/0433; F16B 2/20; F16B 2/22
See application file for complete search history.

(56) References Cited

U.S. PATENT DOCUMENTS

| | | | |
|---|---|---|---|
| 3,822,609 A | 7/1974 | Kotoc | |
| 3,894,706 A * | 7/1975 | Mizusawa | F16L 3/1025 248/68.1 |
| 3,983,602 A * | 10/1976 | Barry | A42B 3/04 24/11 R |
| 4,059,208 A * | 11/1977 | Koepcke | A63C 11/025 280/814 |
| 4,148,113 A * | 4/1979 | Dvorachek | F16L 3/223 24/16 R |
| 4,213,492 A | 7/1980 | Guebert | |
| D267,231 S * | 12/1982 | Guem, Jr. | D21/775 |
| D281,393 S * | 11/1985 | Karnhag | D6/552 |
| 4,688,961 A * | 8/1987 | Shioda | F16B 7/04 24/336 |
| 4,707,892 A * | 11/1987 | Nelson | A01K 97/08 24/336 |
| D295,724 S * | 5/1988 | Shioda | D8/380 |
| D295,725 S * | 5/1988 | Shioda | D8/380 |
| 4,787,591 A * | 11/1988 | Villacorta | B01L 9/50 24/339 |
| 4,883,290 A * | 11/1989 | Landa | A45F 5/021 280/814 |
| 5,178,413 A * | 1/1993 | King | A63C 11/00 224/247 |
| 5,288,047 A * | 2/1994 | Pan | F16L 3/237 248/229.26 |

(Continued)

OTHER PUBLICATIONS

"Optiflex 1300C Handbook". Krohne Messtechnik GmbH. pp. 1, 2, 44. Jul. 2015. (Year: 2015).*

*Primary Examiner* — Matthew M Barker (57) ABSTRACT

A system and apparatus comprising a clip spacer. A first clip is configured to engage a first rod. A second clip is configured to engage a second rod. A bridging member connects the first clip to the second clip. A plurality of lobes formed in the first clip and formed in the second clip are configured to interface with the first rod and the second rod in order to hold the rods a pre-selected distance apart.

16 Claims, 6 Drawing Sheets

(56) References Cited

U.S. PATENT DOCUMENTS

| | | | |
|---|---|---|---|
| 5,316,247 A * | 5/1994 | Wodka | F16L 3/23 248/68.1 |
| 5,331,725 A | 7/1994 | Chou | |
| D363,017 S * | 10/1995 | Noble | D8/395 |
| D363,211 S * | 10/1995 | Noble | D8/371 |
| D375,890 S * | 11/1996 | Takai | D8/380 |
| 6,073,891 A * | 6/2000 | Humber | F16L 3/13 248/217.2 |
| 6,085,589 A * | 7/2000 | Cruickshank | G01F 23/284 73/1.73 |
| 6,298,525 B1 * | 10/2001 | Margo | F16L 3/237 24/336 |
| 6,408,492 B1 * | 6/2002 | Sparks | A01K 97/08 24/10 R |
| 6,584,725 B1 | 7/2003 | Elam | |
| 6,588,272 B2 * | 7/2003 | Mulrooney | G01F 23/263 116/204 |
| 6,906,662 B2 * | 6/2005 | Faust | G01F 23/284 342/124 |
| 6,962,470 B2 | 11/2005 | Anscher | |
| 7,011,277 B2 * | 3/2006 | Mizukoshi | F16L 3/223 248/68.1 |
| 7,267,307 B2 * | 9/2007 | Bauer | F16L 3/223 248/65 |
| 7,478,641 B2 * | 1/2009 | Rousselet | A45D 40/24 132/318 |
| 7,586,435 B1 * | 9/2009 | Edvardsson | G01F 23/284 324/600 |
| 7,658,350 B2 * | 2/2010 | Bauer | F16L 3/223 24/458 |
| 7,827,862 B2 * | 11/2010 | Fauveau | G01F 23/284 73/304 C |
| D660,690 S * | 5/2012 | Mixides | D8/396 |
| 8,733,709 B2 * | 5/2014 | Meyers | B60R 16/0215 248/65 |
| 8,773,302 B2 * | 7/2014 | Edvardsson | G01F 23/284 342/118 |
| 8,941,532 B2 * | 1/2015 | Fredriksson | G01F 23/284 342/124 |
| D732,009 S * | 6/2015 | Bak | D14/229 |
| D739,853 S * | 9/2015 | Lee | D14/253 |
| 9,304,029 B2 * | 4/2016 | Guzman | G01F 23/284 |
| D791,558 S * | 7/2017 | Carpio | D8/1 |
| 2004/0036482 A1 * | 2/2004 | Sherrard | G01F 23/284 324/644 |
| 2005/0067548 A1 * | 3/2005 | Inoue | F16L 3/237 248/635 |
| 2005/0098688 A1 * | 5/2005 | Miarka | F16L 3/223 248/68.1 |
| 2006/0273226 A1 * | 12/2006 | Jatzke | F16L 3/223 248/68.1 |
| 2008/0078244 A1 * | 4/2008 | Dietmeier | G01F 23/268 73/304 C |
| 2012/0216375 A1 | 8/2012 | Druhl | |
| 2015/0070206 A1 * | 3/2015 | Hagglund | H01Q 1/50 342/124 |
| 2015/0276461 A1 * | 10/2015 | Guzman | G01F 23/284 73/290 V |
| 2015/0377387 A1 * | 12/2015 | Meyers | B29C 45/0017 248/74.2 |
| 2015/0377680 A1 * | 12/2015 | Edvardsson | H01Q 1/225 73/290 V |

* cited by examiner

TWIN ROD CLIP SPACER

TECHNICAL FIELD

The present embodiments are generally related to methods, systems, and apparatuses for twin parallel rod spacers used in waveguides for detecting fluid levels.

BACKGROUND

There are numerous applications that require measurement of a fluid or process level. One approach for level measurement includes the use of guided wave radar. Guided wave radar makes use of a level transmitter and one or more radar probes used in applications that require direct contact with the process.

In some applications, guided wave radar sensors can use twin parallel rods as a waveguide to detect process levels. The parallel rods are usually suspended vertically into the process fluid. In order to obtain accurate and precise readings, consistent spacing between the rods is necessary. Such spacing can be compromised by fluid turbulence and other such factors.

Prior art approaches include two part devices that rely on clamp forces to retain the necessary spacing between the rods. However, clamp forces are difficult to maintain at higher process temperatures when using plastic materials because plastic expands and contracts as temperature changes.

Additionally, materials have poor creep resistance. Such materials suffer from "stress relaxation". Over time the clamp force of clamps made from such materials can be lost.

Accordingly, there is a need in the art for improved methods and systems for holding such parallel rods in place.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide clips.

It is another aspect of the disclosed embodiments to provide methods, systems, and apparatuses for holding two rods together.

It is yet another aspect of the disclosed embodiments to provide a clipping device for holding two rods a predetermined distance apart.

It is another aspect of the disclosed embodiments to provide a plurality of spacers which engage two rods in order to maintain a predetermined distance between the rods, and prevent the rods from moving relative to one another.

It is another aspect of the disclosed embodiments to provide methods, systems, and apparatuses for clips which hold two parallel waveguide rods, associated with a level transmitter, a predetermined distance apart and maintain a constant relative distance between the waveguide rods.

The aforementioned aspects and other objectives and advantages can now be achieved as described herein. In one embodiment, a dual rod clipping system comprises a first clip configured to engage a first rod; a second clip configured to engage a second rod; a bridging member connecting the first clip to the second clip; and a plurality of lobes formed in the first clip and formed in the second clip wherein the lobes are configured to interface with the first rod and the second rod.

In another embodiment of the system, the first clip further comprises a first semicircular body, a first inner semicircular surface configured to engage the first rod, and a first exterior semicircular surface. The second clip further comprises a second semicircular body, a second inner semicircular surface configured to engage the second rod, and a second exterior semicircular surface.

In another embodiment, the bridging member is formed between the first exterior semicircular surface and the second exterior semicircular surface. The plurality of lobes formed in the first clip and formed in the second clip further comprise a plurality of toothed lobes formed on the first inner semicircular surface and the second inner semicircular surface, wherein the plurality of toothed lobes are configured to engage a flat side of the first rod and a flat side of the second rod.

In another embodiment, the clip spacer system is comprised of at least one of: polymer, PEEK, and Dupont Teflon fluoropolymer (PTFE). In another embodiment, the system comprises a guided wave radar system wherein the first rod and the second rod comprise parallel guided wave radar rods configured for transporting signals from the guided wave radar system. The bridging member is configured to precisely span a distance between the first clip and the second clip.

BRIEF DESCRIPTION OF THE DRAWINGS

The accompanying figures, in which like reference numerals refer to identical or functionally-similar elements throughout the separate views, and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Guided wave radar sensors can use twin parallel rods as a waveguide to detect fluid level. In an embodiment, consistent spacing is achieved by installing spacers at regular intervals along the length of the twin parallel rods to prevent movement caused by fluid turbulence. In the embodiments disclosed herein, the spacers use a minimal amount of material in order to prevent interference with the radar level measurement. The spacers may be constructed from a non-conductive material such as Polymer, PEEK, PTFE, or other such suitable material. The spacers are subjected to the process fluid environment which may entail very high or very low temperature and/or pressure. The spacers disclosed herein are retained axially on the respective rods to prevent them from sliding due to the force of gravity, and sliding up due to buoyant forces.

In an embodiment, a spacer clip is designed to "snap" into place over the twin rod assembly. Once in place, the spacers can rely on a lock washer installed between rod segments to prevent the clip from sliding. Waveguide rods typically include a machined flat surface. The flat surfaces on the rods are used to tighten the rods in place, so the orientation of the flat surface cannot be selected. The spacer clip makes use of the machined flat features on each of the respective rods to prevent them from moving axially.

The clip may also include a unique lobe design such that at least one, and potentially several, lobes on the clip interface with the flat surfaces on the rods regardless of the orientation of the flat surfaces. The embodiments disclosed herein take advantage of a mechanical stop to retain the clip on the rods.

In another embodiment, the clip may not include lobes. In this embodiment, the clip would rest on a washer separating the rod segments. It should be appreciated that this embodiment is preferable in fluids that are less dense than the material of the clip.

Figure 1:
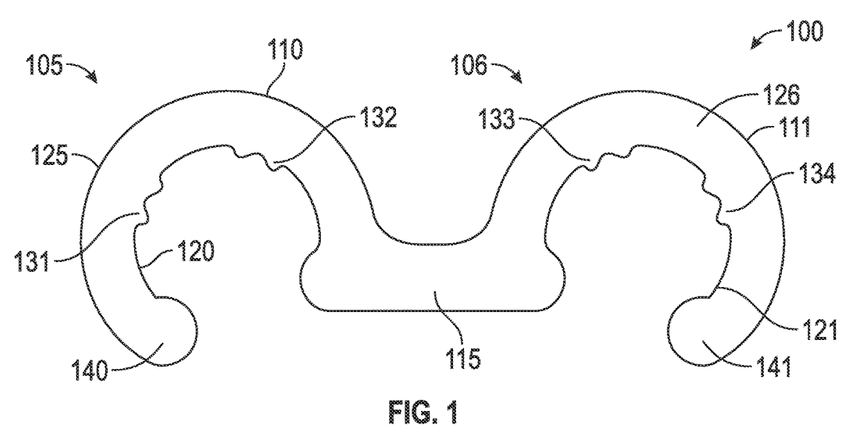
FIG. 1 depicts a dual rod clipping device in accordance with the disclosed embodiments.

FIG. 1 illustrates one embodiment of the twin rod clip spacer 100. The twin rod clip spacer 100 includes two symmetrical clips 105 and 106. The clips 105 and 106 are semicircular and are formed to engage rods such as the waveguide rods. The twin rod clip spacer 100 includes a bridging member 115 which is formed between the clips 105 and 106. Twin rod clip spacer 100 may be subject to the process environment (e.g., hazardous or corrosive process materials) being measured by a level measuring device. The twin rod clip spacer 100 can be constructed from non-conductive materials such as Polymer, PEEK, PTFE which are resistant to the various conditions that may be present in the process environment.

Bridging member 115 serves two purposes. First, it serves as the physical connection between clips 105 and 106, and also, by extension, the connection between the twin rods. Bridging member 115 may be molded on either side to the clips 105 and 106. In addition, bridging member 115 also serves to define the spacing between the twin rods. It should be appreciated that in some embodiments this spacing may be specifically selected and critically important for a given application or arrangement of twin rods.

The clip 105 includes a semi-circular body 125 which includes an inner surface 120 and outer surface 110. The inner surface 120 includes at least one, and potentially many, lobes 131 and 132. Lobes 131 and 132 are configured to engage the edges or other surfaces of a rod. In one embodiment, the lobes are formed as one or more molded extrusions along the inner surface of the clip. The extrusions may form a dual tooth pattern as illustrated in FIG. 1. The extrusions may run the vertical length of the clip or may be formed along a limited vertical section of the clip. It should be appreciated that the embodiment illustrated in FIG. 1 shows only 2 such lobes 131 and 132. Additional lobes may be included depending on design considerations. A retention nub 140 is formed at the open end of clip 105.

Similarly, clip 106 includes a semicircular body 126, which includes an inner surface 121 and outer surface 111. The inner surface 121 includes at least one, and potentially many, lobes 133 and 134. Lobes 133 and 134 are configured to engage the edges of the other of the twin rods. In one embodiment, the lobes are formed as one or more molded extrusions along the inner surface of the clip. The extrusions may run the vertical length of the clip or may be formed along a limited vertical section of the clip. It should be appreciated that the embodiment illustrated in FIG. 1 shows only 2 such lobes 133 and 134. Additional lobes may be included depending on design considerations, as illustrated in FIGS. 3A-3D. A retention nub 141 is formed at the open end of clip 106.

FIGS. 2A-2D illustrate various embodiments of the engagement of one of clips 105 or 106 with a rod 200. It should be appreciated that the twin rod clip spacer 100 includes both clips 105 and 106 and that the embodiments illustrated in FIGS. 2A-2D are equally indicative of the engagement of clips 105 or 106 with a rod 200.

Figure 2A:
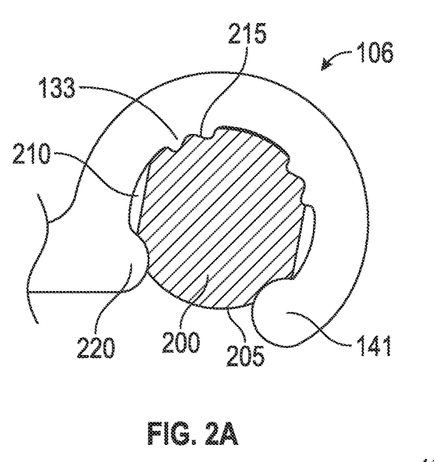
FIG. 2A depicts a section of a dual rod clipping device and associated lobes in accordance with the disclosed embodiments.

FIG. 2A illustrates the engagement of clip 106 (or equivalently clip 105) with rod 200. Rod 200 includes at least one and potentially multiple rounded surfaces 205 and at least one and potentially multiple flat surfaces 210. At the intersection of one such flat surface 210 and round surface 205 is a corner 215. It should be understood that each intersection of flat surface 210 and rounded surface 205 results in a corner 215. In the embodiment illustrated in FIG. 2A, corner 215 is engaged by lobe 133. The engagement by lobe 133 prevents the rotation of rod 200. In addition, retention nub 141 and inner retention nub 220 serve to hold other corners of rod 200. These points of contact between clip 106 and rod 200 ensure that rod 200 does not rotate inside clip 106 and prevents clip 106 from sliding along rod 200.

Figure 2B:
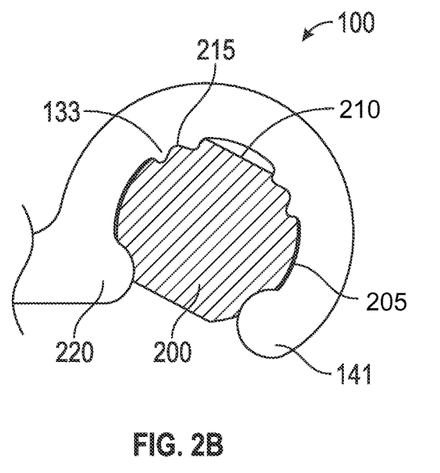
FIG. 2B depicts a section of a dual rod clipping device and associated lobes engaged with a rod in accordance with the disclosed embodiments.
Figure 2C:
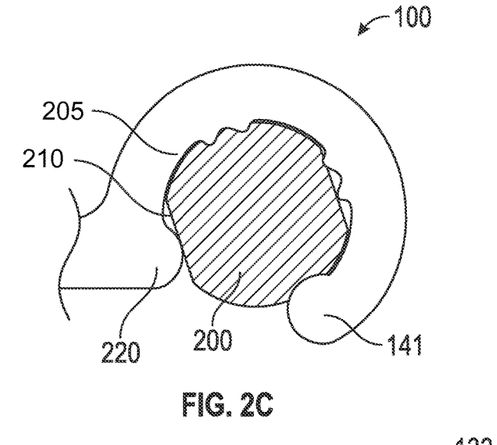
FIG. 2C depicts a section of a dual rod clipping device and associated lobes engaged with a rod in accordance with the disclosed embodiments.

FIGS. 2B-2C illustrate a similar arrangement of clip 106 clipped to rod 200. In each of FIGS. 2B-2D, rod 200 is shown in a different rotated position. Rod 200 generally may include a number of threaded subsections which are tightened via a twisting motion. As such, the orientation of the flat surfaces 210 and rounded surfaces 205 cannot be controlled and is instead determined by the rotation required to tighten the connection between subsections of the rod 200.

Figure 2D:
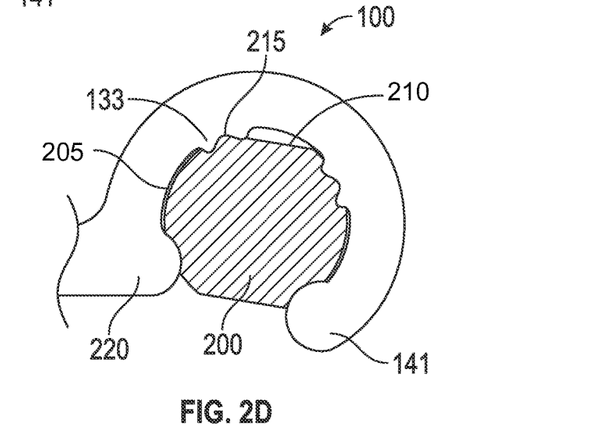
FIG. 2D depicts a section of a dual rod clipping device and associated lobes engaged with a rod in accordance with the disclosed embodiments.

FIGS. 2B-2D are intended to illustrate that clip 106 can securely engage with, or clip onto, rod 200 regardless of the orientation of flat surfaces 210 and rounded surfaces 205. Thus, regardless of angular position of rod 200, at least one lobe 133 and 134, and/or at least one of retention nub 141 and second retention nub 220 on the clip 106 will fit into the flat surface 210 and/or corner 215 of the rod 200. This provides excellent axial retention of the rod 200.

Figure 3A:
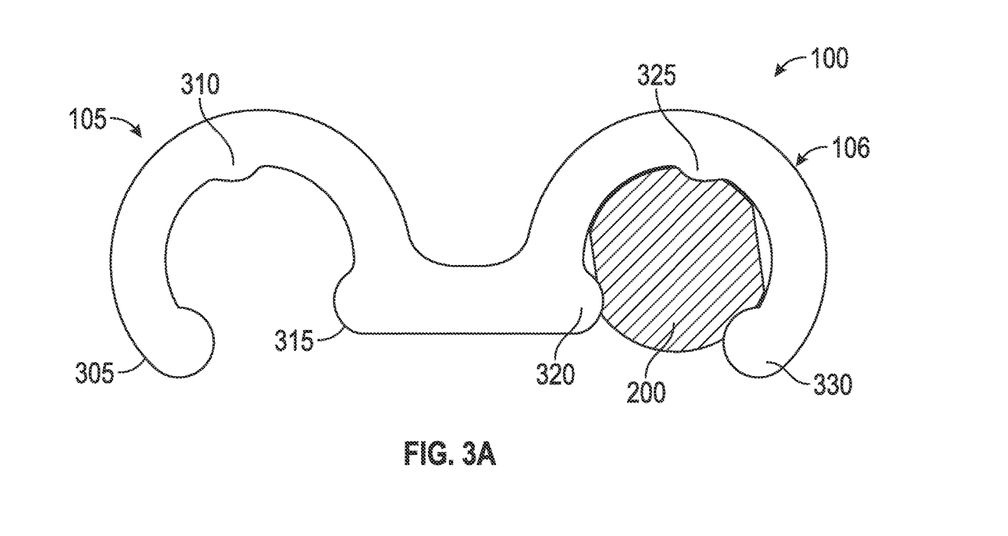
FIG. 3A depicts a dual rod clipping device and associated lobes engaged with a single rod in accordance with an embodiment.
Figure 3B:
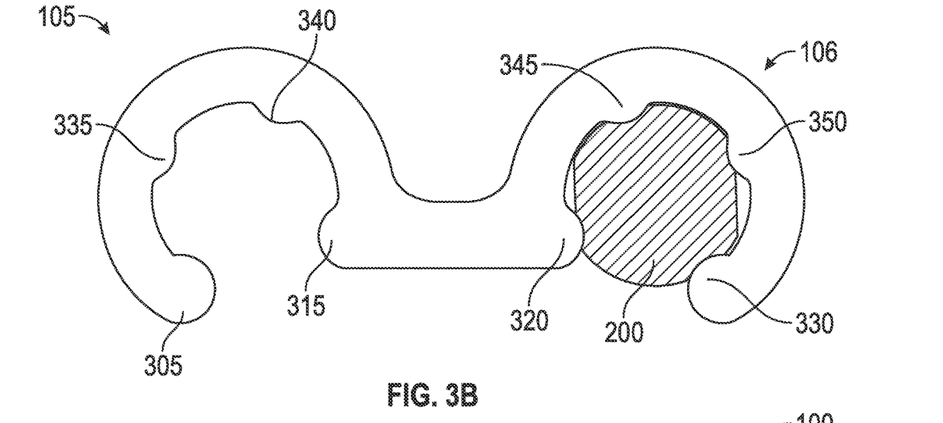
FIG. 3B depicts a dual rod clipping device and associated lobes engaged with a single rod in accordance with an embodiment.

FIG. 3A illustrates an alternative embodiment of twin rod clip spacer 100 wherein twin rod clip spacer 100 includes lobes which are configured as retention nub lobes 305, 310, 315, and wherein clip spacer 105 includes lobes which are configured as retention nub lobes 320, 325, and 330. It should be appreciated that any number of such retention nub lobes may be included in twin rod clip spacer 100 depending on design considerations. FIG. 3B illustrates one such embodiment wherein clip 105 includes four retention nub lobes 305, 335, 340, and 315 and clip 106 includes four retention nub lobes 320, 345, 350, and 330.

Figure 3C:
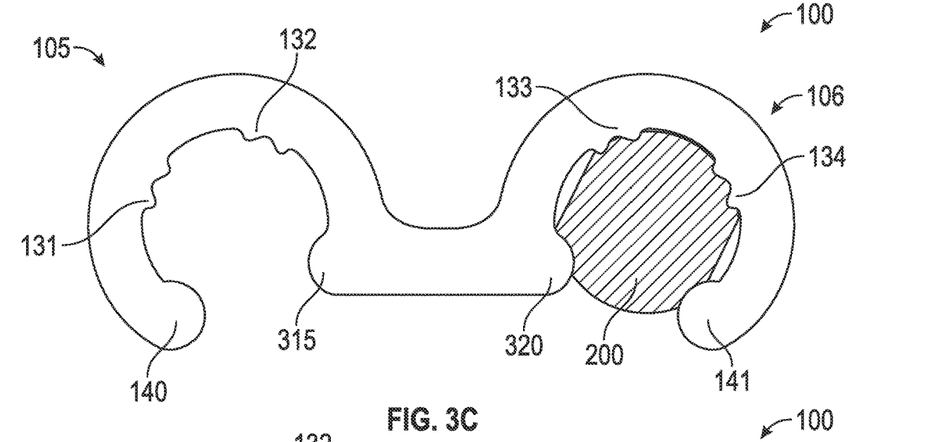
FIG. 3C depicts a dual rod clipping device and associated lobes engaged with a single rod in accordance with an embodiment.

FIG. 3C illustrates another embodiment of twin rod clip spacer 100 wherein twin rod clip spacer 100 includes lobes 131, 132 on clip 105 and lobes 133 and 134 on clip 106. Clip 106 is engaged with rod 200 for purposes of illustration. In this embodiment, retention nub 140 is included on clip 105 and retention nub 141 is retained on clip 106.

Figure 3D:
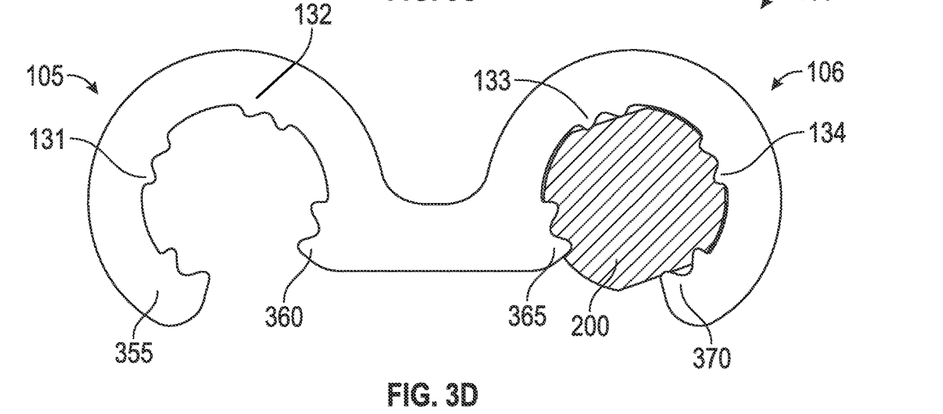
FIG. 3D depicts a dual rod clipping device and associated lobes engaged with a single rod in accordance with an embodiment.

FIG. 3D illustrates another embodiment of twin rod clip spacer 100 where the retention nubs are replaced by lobes. Specifically, the end of clip 105 includes lobe 355 and lobe 360 is included on the opposite side. The clip 105 includes lobes 131 and 132. Similarly, clip 106 includes lobe 370 and lobe 365 is formed on the opposite end. Clip 106 also has lobe 133 and lobe 134.

FIGS. 3A-3D are intended to be exemplary. It should be appreciated that various combinations of lobes, retention nubs, and retention nub lobes may be alternatively combined without departing from the scope of the embodiments disclosed herein.

Figure 4:
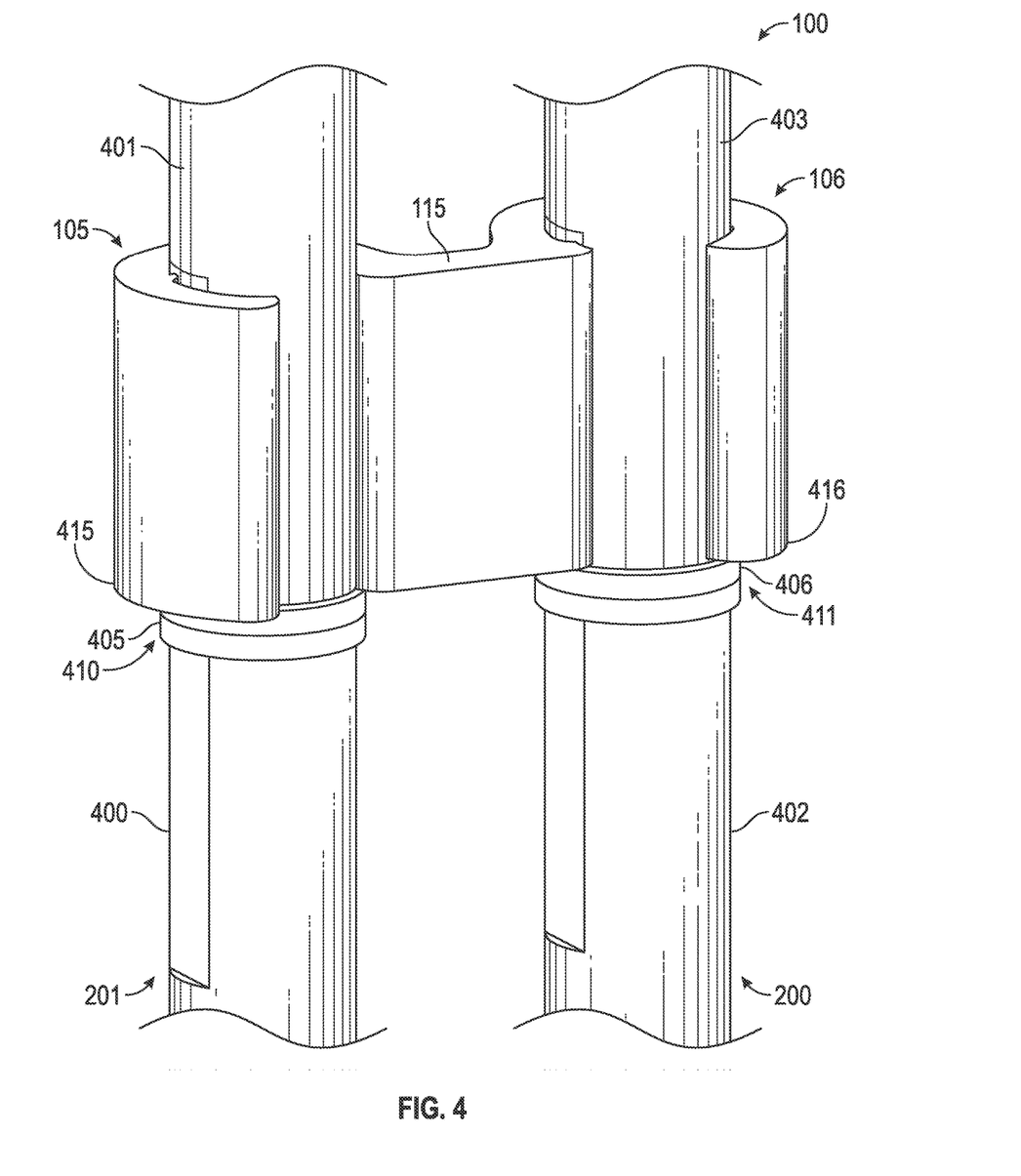
FIG. 4 depicts a graphical representation of a dual clipping device engaged with two rods in accordance with another embodiment.

FIG. 4 illustrates a twin rod spacer clip 100 engaged on a pair of waveguide rods 200 and 201. Clip 105 is clipped onto waveguide rod 201 and clip 106 is clipped onto waveguide rod 200. Bridging member 115 is formed between clips 105 and 106. The bridging member 115 is molded to clips 105 and 106 and is selected to appropriately define and maintain the gap between waveguide rods 200 and 201.

Rods 200 and 201 can be modular. Sections of rods 200 and 201, respectively, can be added to the rods in order to adjust their length. Rod 201 illustrated in FIG. 4 includes two rod sections 400 and 401. Rod sections 400 and 401 are joined at a joint 405. Additional sections are possible. One or more washers, such as lock washer 410, may be included at the joint 405 of rod sections 400 and 401. Lock washer 410 creates a shoulder upon which a flat bottom portion 415 of clip 105 can rest. This shoulder prevents clip 105 from sliding down waveguide rod 201.

Likewise, rod 200 illustrated in FIG. 4 includes two rod sections 402 and 403. Rod sections 402 and 403 are joined at a joint 406. Additional rod sections are possible. One or more washers, such as lock washer 411, may be included at the joint 406 of rod sections 402 and 403. Lock washer 411 creates a shoulder upon which a flat bottom portion 416 of clip 106 can rest. This shoulder prevents clip 106 from sliding down waveguide rod 200.

In some embodiments, the density of the twin rod spacer clip 100 may be less than the process fluid being measured. In such circumstances, the clip may be buoyant. It should be appreciated that the shoulder created by lock washers 410 and 411 may equivalently prevent the twin rod spacer clip 100 from sliding up the rods 200 and 201, respectively, due to the buoyant force experienced by the twin rod spacer clip 100. As in the example illustrated in FIG. 4, the shoulder can hold against a flat top portion of clips 105 and 106, respectively.

Figure 5:
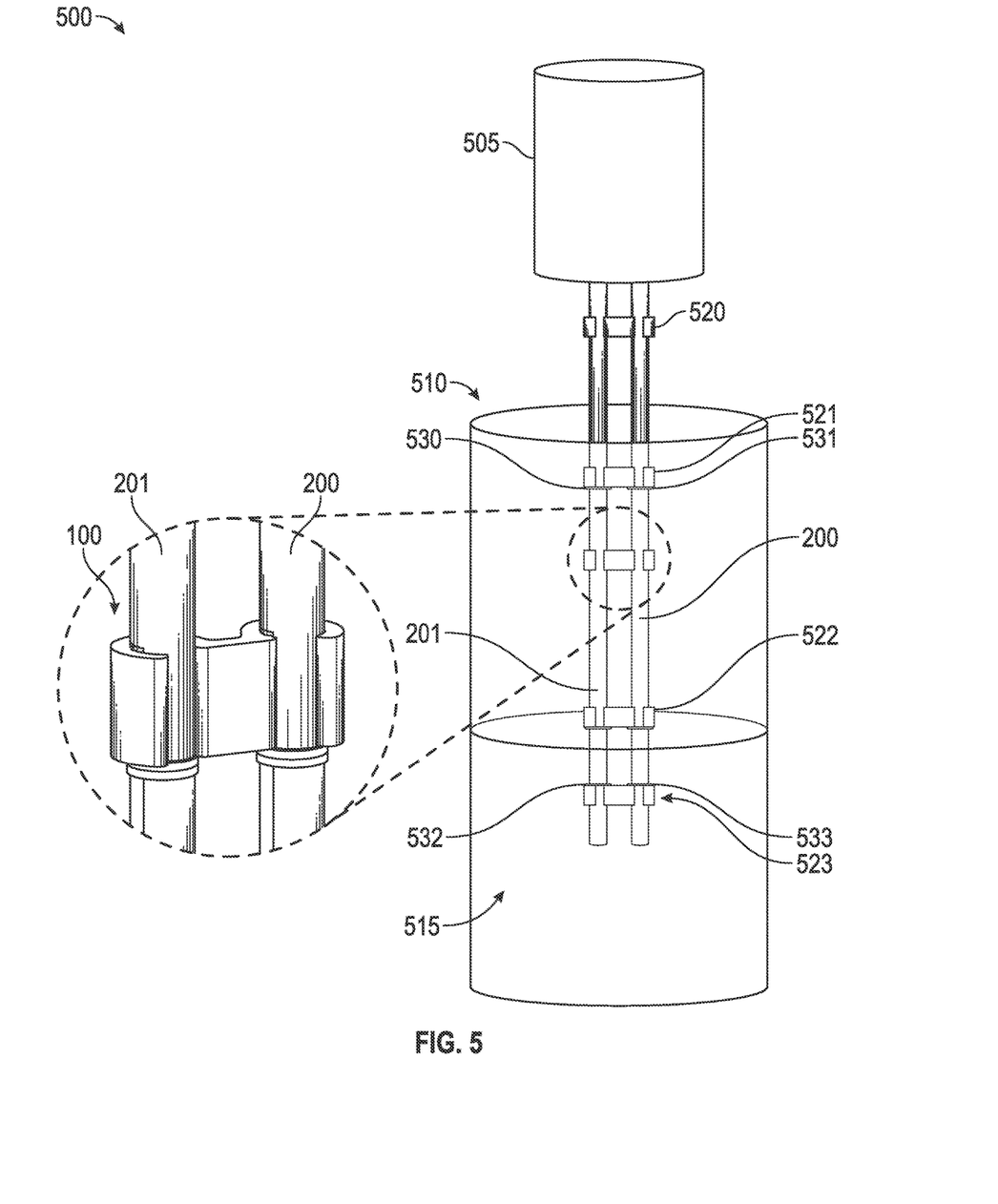
FIG. 5 depicts a block diagram of a system for measuring the level of a material, in accordance with an embodiment.

FIG. 5 illustrates a system 500 in accordance with an embodiment. The system 500 includes a guided wave radar module 505 configured to determine the level of a substance 515 in a tank 510. The guided wave radar module 505 may be any number of known devices configured to transmit signals along wave guide rods 201 and 200, and then determine the level of a substance 515. Rods 200 and 201 are extended from the guided wave radar system and are held at a preselected distance apart from one another using a number of twin rod clip spacers 520, 521, 100, 522, and 523.

The twin rod clip spacers 520, 521, 100, 522, and 523 are disposed along, and clipped to, rods 200 and 201 at a number of locations. For example, twin rod clip spacer 523 is clipped to rods 200 and 201 below the surface of process fluid 515. In FIG. 5, the twin rod clip spacer 523 is less dense than process fluid 515. Twin rod clip spacer 523 is thus held below the surface of process fluid 515 because the flat top surface of twin rod clip spacer 523 is pressed against lock washers 532 and 533. Twin rod clip spacer 523 is preferably formed of a material that is resistive to the corrosive characteristics of the process fluid 515.

Similarly, twin rod dip spacer 520 illustrates that in some embodiments twin rod clip spacers may be engaged to rods 200 and 201 outside of an enclosure such as tank 510. The flat bottom surface of twin rod clip spacer 521 is at rest against lock washers 530 and 531. Lock washers 530 and 531 can help prevent twin rod clip spacer 521 from sliding along rods 200 and 201.

An exploded view of twin rod clip spacer 100 is provided. This exploded view illustrates the engagement of twin rod dip spacer 100 to rods 200 and 201. It should be appreciated that each of twin rod clip spacers 520, 521, 100, 522, and 523 can similarly engage rods 200 and 201. In addition, it should be appreciated that each of twin rod clip spacers 520, 521, 100, 522, and 523 may include one or many of the features in the various embodiments illustrated in FIG. 1-FIG. 3D. FIG. 5 illustrates the use of five twin rod clip spacers. It should be appreciated that any number of clips may be used depending on the specific application and design considerations.

Twin rod clip spacers 520, 521, 100, 522, and 523 may be snapped on to rods 200 and 201 before or after rods 200 and 201 are assembled to their desired length. Twin rod clip spacers 520, 521, 100, 522, and 523 may also be engaged or disengaged with rods 200 and 201 at any time before or after the deployment and use of the system 500 as necessary.

Figure 6:
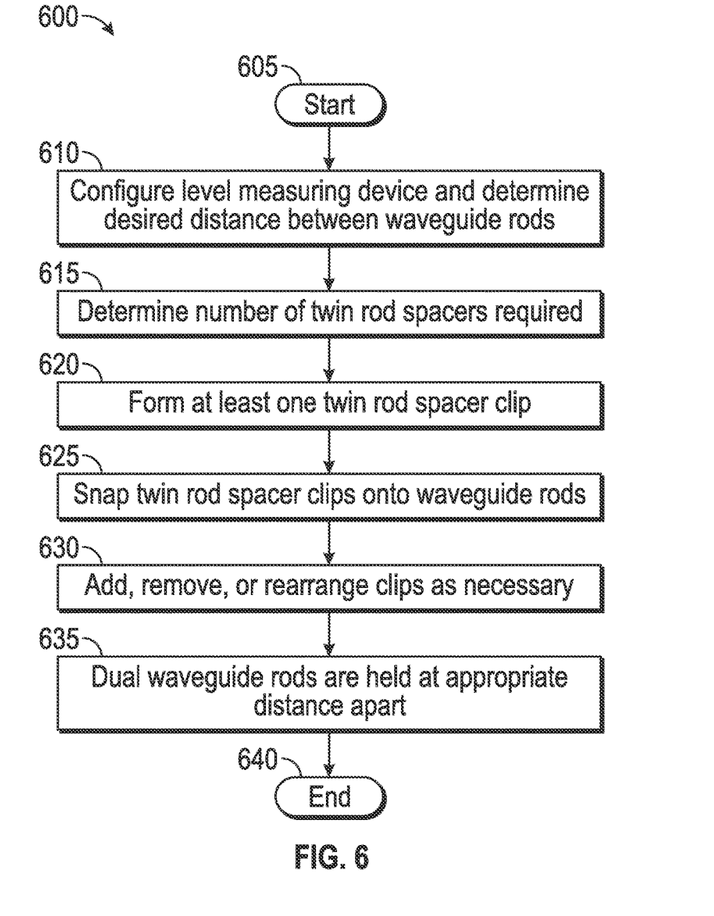
FIG. 6 depicts a flow chart of logical operational steps associated with a method, in accordance with another embodiment.

FIG. 6 illustrates a flow chart 600 of logical operational steps associated with setting and holding a distance between dual waveguide rods in a level measuring device in accordance with embodiments. The method begins at block 605.

At block 610, a level measuring device can be configured and a distance between dual waveguide rods can be determined. The number of spacers required can next be determined at block 615.

At block 620, at least one twin rod clip spacer such as twin rod clip spacer 100 can be formed. The distance between the dual waveguide rods can be used to form the twin rod clip spacers with a bridging member of a length that properly spaces the dual waveguide rods at the desired distance. The simple shape of twin rod clip spacer 100 can be made either by profile cutting plastic material (water jet, laser, etc.) or the part can be extruded. No secondary machining is required.

The twin rod clip spacers can be snapped onto the dual waveguide rods as illustrated at block 625. The twin rod clip spacers may be snapped onto the rods such that they are held in position by lock washers between sections of the respective rods. The clips may be added to, removed from, or rearranged on the dual waveguides as desired at block 630.

The twin rod clip spacers thus hold the dual waveguide rods at a desired distance apart as shown at block 635. The method ends at block 640.

According to the embodiments described above, a twin rod clip spacer is provided that can "snap" into place over a twin rod assembly associated with a level measuring device. Once in place, the twin rod clip spacers rely on a lock washer installed between rod segments to prevent the twin rod clip spacers from sliding along the rods. The clip can use a machined flat feature on the rod to prevent it from moving in the other axial direction.

Flat surfaces on the rods are used to tighten the threaded segments of the rods in place, which results in a random orientation of the flat surfaces on the rod. The twin rod clip spacer can use a unique lobe design such that there will always be at least one lobe that interfaces with the flat surface, rounded surface, or corner of the waveguide rod, regardless of the rod's orientation. Because clamping forces are difficult to maintain at higher process temperatures when using plastic materials, the disclosed embodiments take advantage of mechanical stops and the unique lobe design to retain the twin rod clip spacers.

The twin rod clip spacers are simple to install, requiring no tools. The simple shape of the twin rod clip spacer also has the advantage that it can be made either by profile cutting plastic material (via water jet, laser, etc.) or it can be extruded. No secondary machining is required.

Based on the foregoing, it can be appreciated that a number of embodiments, preferred and alternative, are disclosed herein. For example, in one embodiment, a system comprises a first clip configured to engage a first rod; a second clip configured to engage a second rod; and a bridging member connecting the first clip to the second clip.

In another embodiment of the system, the first clip further comprises a first semicircular body, a first inner semicircular surface configured to engage the first rod, and a first exterior semicircular surface. The second clip further comprises a second semicircular body, a second inner semicircular surface configured to engage the second rod, and a second exterior semicircular surface. In another embodiment, the bridging member is molded between the first exterior semicircular surface and the second exterior semicircular surface.

In another embodiment, a plurality of lobes are formed in the first clip and formed in the second clip. The lobes further comprise a plurality of toothed lobes formed on the first inner semicircular surface and the second inner semicircular surface, wherein the plurality of toothed lobes are configured to engage a flat side of the first rod and a flat side of the second rod.

In another embodiment, the clip spacer system is comprised of at least one of: polymer, PEEK, and PTFE. In another embodiment, the system comprises a guided wave radar system wherein the first rod and the second rod comprise parallel guided wave radar rods configured for transporting signals from the guided wave radar system. The bridging member is configured to precisely span a distance between the first clip and the second clip.

In another embodiment, a clip spacer comprises a first clip configured to engage a first rod; a second clip configured to engage a second rod; a bridging member connecting the first clip to the second clip; and a plurality of lobes formed in the first clip and formed in the second clip wherein the lobes are configured to interface with the first rod and the second rod.

In another embodiment, the clip spacer further comprises a first semicircular body, a first inner semicircular surface configured to engage the first rod, and a first exterior semicircular surface; and the second clip further comprises a second semicircular body, a second inner semicircular surface configured to engage the second rod, and a second exterior semicircular surface.

In another embodiment of the clip spacer, the bridging member is molded between the first exterior semicircular surface and the second exterior semicircular surface. The plurality of lobes formed in the first clip and formed in the second clip further comprise a plurality of toothed lobes formed on the first inner semicircular surface and the second inner semicircular surface, wherein the plurality of toothed lobes are configured to engage a flat side of the first rod and a flat side of the second rod.

In another embodiment, the clip spacer is comprised of at least one of polymer, PEEK, and PTFE. The clip spacer further comprises a guided wave radar wherein the first rod and the second rod comprise parallel guided wave radar rods configured for transporting signals from the guided wave radar. Additionally, the bridging member is configured to precisely span a distance between the first clip and the second clip.

In yet another embodiment, a system comprises a guided wave radar system; two parallel rods; and a clip spacer connected to the two parallel rods comprising: a first clip configured to engage the first rod; a second clip configured to engage the second rod; a bridging member connecting the first clip to the second clip; and a plurality of lobes configured to interface with the first rod and the second rod in order to hold the two parallel rods at a constant distance from one another.

In another embodiment, the first clip further comprises a first semicircular body, a first inner semicircular surface configured to engage the first rod, and a first exterior semicircular surface; and the second clip further comprises a second semicircular body, a second inner semicircular surface configured to engage the second rod, and a second exterior semicircular surface.

In another embodiment, the system comprises a plurality of the clip spacers wherein the plurality of clip spacers are connected to the two parallel rods at intervals along the two parallel rods. The plurality of clip spacers further comprise a plurality of toothed lobes formed on the first inner semicircular surface and the second inner semicircular surface, wherein the plurality of toothed lobes are configured to engage the two parallel rods.

In another embodiment, a plurality of washers separate a plurality of segments of the two parallel rods. Each of the plurality of clip spacers is supported by at least one of the plurality of washers.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A system comprising:
   a guided wave radar sensor with twin parallel rods:
   a first rod configured as one of said twin parallel rods, said first rod having at least one flat surface, wherein said first rod including a first plurality of segments;
   a second rod configured as another of said twin parallel rods, said second rod having at least one flat surface, wherein said second rod including a second plurality of segments;
   a first clip configured to engage said first rod;
   a second clip configured to engage said second rod;
   a bridging member connecting said first clip to said second clip; and
   a plurality of washers, wherein a first washer of said plurality of washers separates each of said first plurality of segments of said first rod and a second washer of said plurality of washers separates each of said second plurality of segments of said second rod, and
   wherein said first clip rests on said first washer and said second clip rests on said second washers, of said plurality of washers.

2. The system of claim 1 wherein said first clip further comprises:
   a first semicircular body, a first inner semicircular surface configured to engage said first rod, and a first exterior semicircular surface; and
   said second clip further comprises:
   a second semicircular body, a second inner semicircular surface configured to engage said second rod, and a second exterior semicircular surface.

3. The system of claim 2, further comprising:
   a plurality of lobes formed on said first inner semicircular surface and a plurality of lobes formed on said second inner semicircular surface wherein said lobes are configured to interface with at least one of said first rod and said second rod.

4. The system of claim 3 wherein said plurality of lobes formed on said first inner semicircular surface and said plurality of lobes formed on said second inner semicircular surface further comprise:
   a plurality of toothed lobes, wherein said plurality of toothed lobes are configured to engage said flat surface of said first rod and said flat surface of said second rod.

5. The system of claim 1 wherein said first clip, said second clip, and said bridging member are comprised of at least one of:
   PEEK; and
   PTFE.

6. The system of claim 1 wherein said bridging member is configured to span a predetermined distance between said first clip and said second clip.

7. An apparatus comprising:
   a guided wave radar sensor with twin parallel rods;
   a first rod configured as one of said twin parallel rods, said first rod comprising at least one rounded surface and at least one flat surface, wherein said first rod including a first plurality of segments;
   a second rod configured as another of said twin parallel rods said second rod comprising at least one rounded surface and at least one flat surface, wherein said second rod including a second plurality of segments;
   a first clip configured to engage a first rod;
   a second clip configured to engage a second rod; and
   a bridging member connecting said first clip to said second clip;
   a plurality of washers, wherein a first washer of said plurality of washers separates each of said first plurality of segments of said first rod and a second washer of said plurality of washers separates each of said second plurality of segments of said second rod, and
   wherein said first clip rests on said first washer and said second clip rests on said second washers, of said plurality of washers.

8. The apparatus clip spacer of claim 7 wherein said first clip further comprises:
   a first semicircular body, a first inner semicircular surface configured to engage said first rod, and a first exterior semicircular surface; and
   said second clip further comprises:
   a second semicircular body, a second inner semicircular surface configured to engage said second rod, and a second exterior semicircular surface.

9. The apparatus of claim 8 further comprising;
   a plurality of lobes formed on said first inner semicircular surface; and a plurality of lobes formed on said second inner semicircular surface.

10. The apparatus claim 9 wherein said plurality of lobes formed on said first inner semicircular surface and said plurality of lobes formed on said second inner semicircular surface further comprise:
a plurality of toothed lobes.

11. The apparatus of claim 7 wherein said first clip, said second clip, and said bridging member are comprised of at least one of:
PEEK; and
PTFE.

12. The apparatus of claim 7 wherein said bridging member is configured to span a predetermined distance between said first clip and said second clip.

13. A system comprising:
a guided wave radar system;
two parallel rods comprising a first rod with at least one flat surface and a second rod with at least one flat surface, wherein said first rod including a first plurality of segments and said second rod including a second plurality of segments; and
a clip spacer connected to said two parallel rods comprising:
a first clip configured to engage said first rod;
a second clip configured to engage said second rod;
a bridging member connecting said first clip to said second clip; and
a plurality of lobes configured to interface with said first rod and said second rod in order to hold said two parallel rods at a constant distance from one another;
a plurality of washers, wherein a first washer of said plurality of washers separates each of said first plurality of segments of said first rod and a second washer of said plurality of washers separates each of said second plurality of segments of said second rod, and
wherein said first clip rests on said first washer and said second clip rests on said second washers, of said plurality of washers.

14. The system of claim 13 wherein said first clip further comprises:
a first semicircular body, a first inner semicircular surface configured to engage said first rod, and a first exterior semicircular surface; and
said second clip further comprises:
a second semicircular body, a second inner semicircular surface configured to engage said second rod, and a second exterior semicircular surface.

15. The system of claim 14 further comprising a plurality of said clip spacers wherein said plurality of clip spacers are connected to said two parallel rods at intervals along said two parallel rods.

16. The plurality of clip spacers of claim 15 further comprising a plurality of toothed lobes formed on each of said first inner semicircular surfaces and a plurality of toothed lobes formed on each of said second inner semicircular surfaces.

* * * * *